Hayes & Newman,
Machine for Edging Boards,
No. 36150, Patented Aug. 12, 1862.
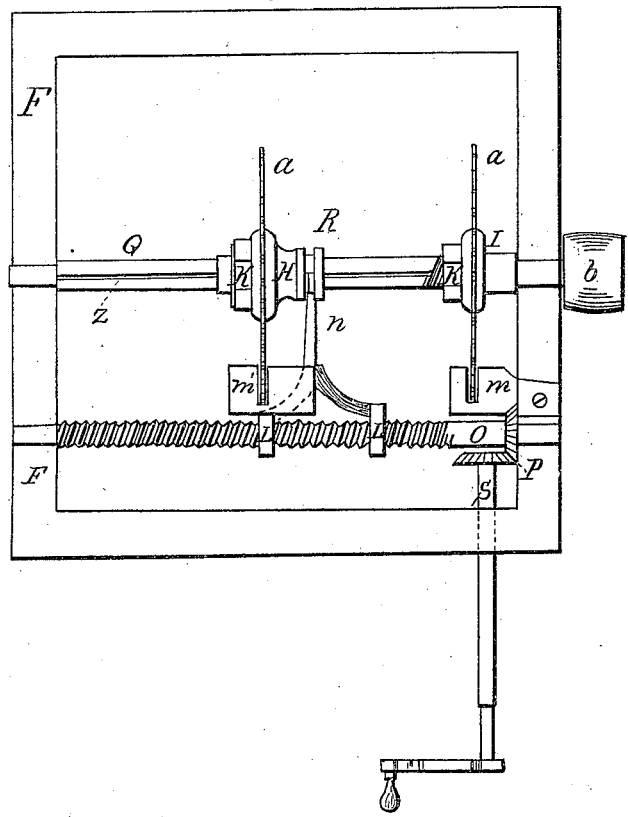
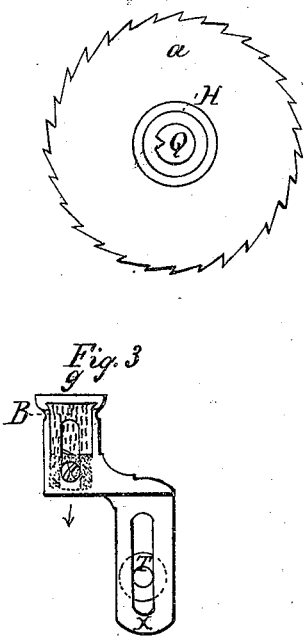
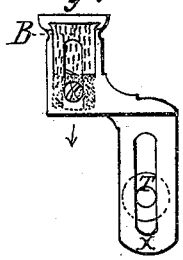
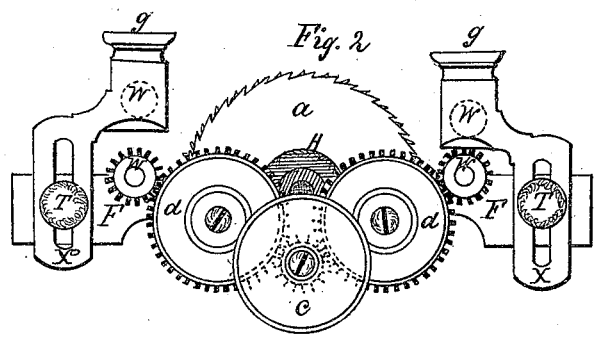
Witnesses
E. S. Gardner
A. B. Watson
Inventor
Clark J. Hayes
Martin Newman

UNITED STATES PATENT OFFICE.

CLARK I. HAYES AND MARTIN NEWMAN, OF UNADILLA, NEW YORK.

IMPROVED MACHINE FOR EDGING AND SLITTING BOARDS.

Specification forming part of Letters Patent No. 36,150, dated August 12, 1862.

*To all whom it may concern:*

Be it known that we, CLARK I. HAYES and MARTIN NEWMAN, of Unadilla, Otsego county, State of New York, have invented certain new and useful Improvements in Machinery for Edging Boards or Slitting Boards of Various Widths that Require Parallel Edges; and we do hereby declare that the following is a full, clear, and exact description of the same, reference being had to the accompanying drawings, forming part of this specification, in which—

Figure 1 is a view looking down upon the top of the machine, showing the principal parts. Fig. 2 is a view of the side of the machine, showing the arrangement of pressure-rollers. Fig. 3 shows a plan view of the adjustable yielding box that supports the upper set of pressure-rollers. Fig. 4 is a vertical section of saw-arbor and sliding hub and collars which hold one of the saws $a\ a$.

Similar letters of reference indicate corresponding parts in each of the several figures.

The nature of our invention consists of two circular saws on one mandrel or arbor so constructed as to be adjustable for the purpose of edging boards of all widths, taking off both edges at the same time, and making both edges parallel to each other; also, for the purpose of slitting up boards of all widths, that their edges may be parallel. Furthermore, there is an arrangement of adjustable pressure-rollers with yielding boxes, whereby the rollers can be adjusted to suit any thickness of lumber, and the yielding box will allow the rollers to accommodate any inequalities that might be in the thickness of the lumber, insuring a constant uniform pressure of the feed-rollers, and is more fully explained as follows:

Q is the saw mandrel or arbor, mounted with two circular saws, $a\ a$, as seen in Fig. 1. The saw on hub H, Fig. 1, is secured in the usual manner by the screw-nuts K K and the collars. The hub H, with its saw mounted as seen in Fig. 1, is made to slide on the mandrel by means of the arm N and the screw O, acting upon the nuts or boxes L L. The end of arm N fits in a groove in the hub H, as seen at R. The hub H is provided with a tongue or projection, which fits a corresponding groove in the saw-mandrel, which admits of the saw and hub sliding from one end of the mandrel to the other, perfectly free, and yet the saw is made to revolve with the mandrel. This tongue and groove can be seen best in the vertical section of Fig. 4. Motion is given to the saw-mandrel Q through pulley $b$. Motion is given to the screw O by turning crank-shaft S, which communicates its motion through the bevel-gears P.

M″ M are rests or supports for the lumber to rest upon when the saws are cutting. M″ is attached to arm N and nuts L L, so as to move with the saw as it is made to slide on the mandrel Q.

F F is a frame on which the several parts constituting the machine are mounted.

W W W W in Fig. 2 show an end view of the pressure-rollers. C is a driving-pulley, and motion is transmitted to the lower set of feed-rollers W W through the intermediate gears, $d\ d$, and the pinion attached to the driving-pulley C, as shown by the dotted lines on pulley C.

X X are to represent the adjustable boxes which mount the upper set of rollers W W, their lower part being slotted. The box can be elevated or depressed at pleasure and secured at any point by means of set-screws T T in Fig. 2.

$g\ g$ are caps on boxes X X, which are removable.

Fig. 3 shows a plan of box X.

B represents a rubber spring or its equivalent, with its upper end resting against the cap $g$ and its lower end pressing down upon the box V, as shown by the shading of small dots. The case containing the box V and rubber B is slotted, so as to allow the journals of the feed-rollers to move freely with rubber and box V.

Z represents the groove in the saw-mandrel Q.

The operation of this machine is as follows: Motion is given to the saw-mandrel by applying a belt driven by any suitable power to pulley $b$. The screw O is turned by turning crank-shaft S either to the right or left until the saws are brought to the desired distance apart. A board of the thickness that is intended to operate upon is placed upon the front and lower roller. Then the upper roller is brought down firmly upon the board, and the upper roller held firmly in this position by turning up the set-screws T T.

The box X° represents the rollers, being much farther apart than X on the right-hand side of Fig. 2.

We do not limit our claim to the use of the screw O and bevel-gear P, for a rack and pinion may be substituted for them.

What we claim as our invention, and desire to secure by Letters Patent, is—

The construction of a machine as described, having two saws on one mandrel, one of which is movable and adjustable, as and for the purpose described.

CLARK I. HAYES.
MARTIN NEWMAN.

Witnesses:
A. B. WATSON,
PERRY P. ROGERS.